United States Patent Office 2,762,335
Patented Sept. 11, 1956

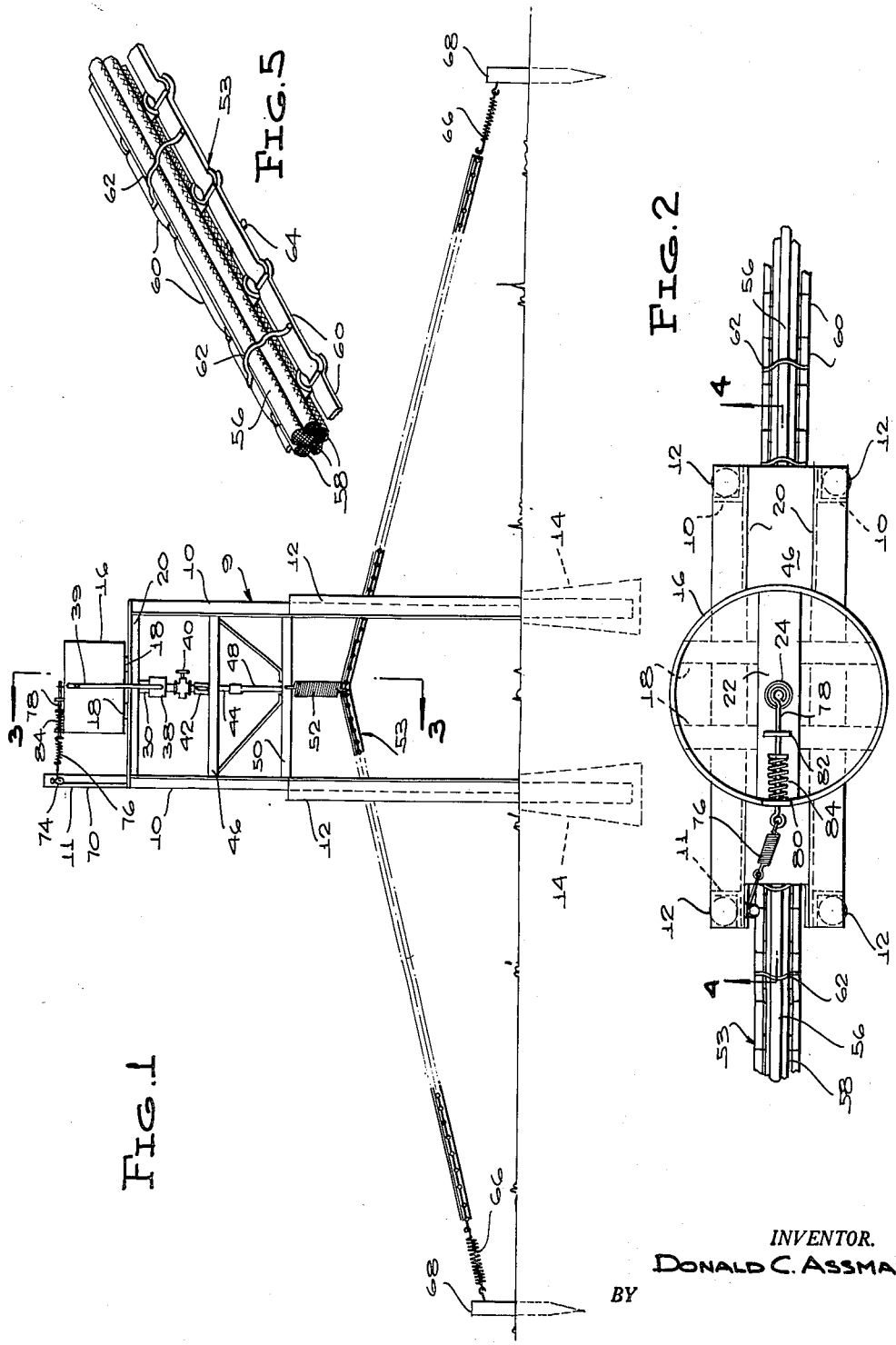

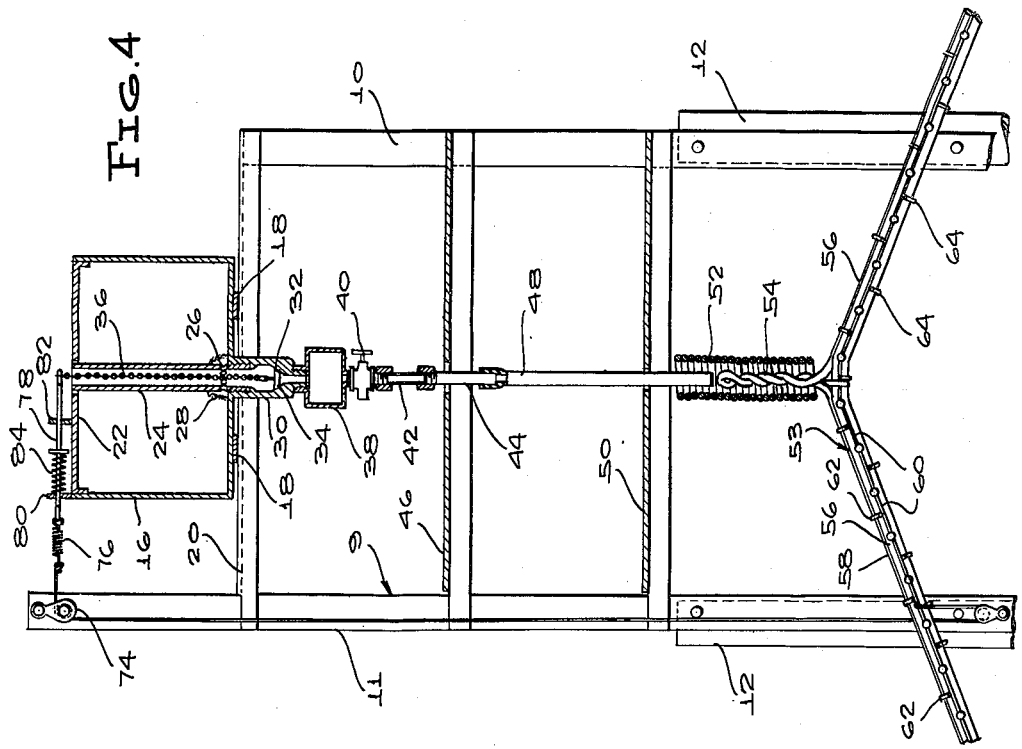
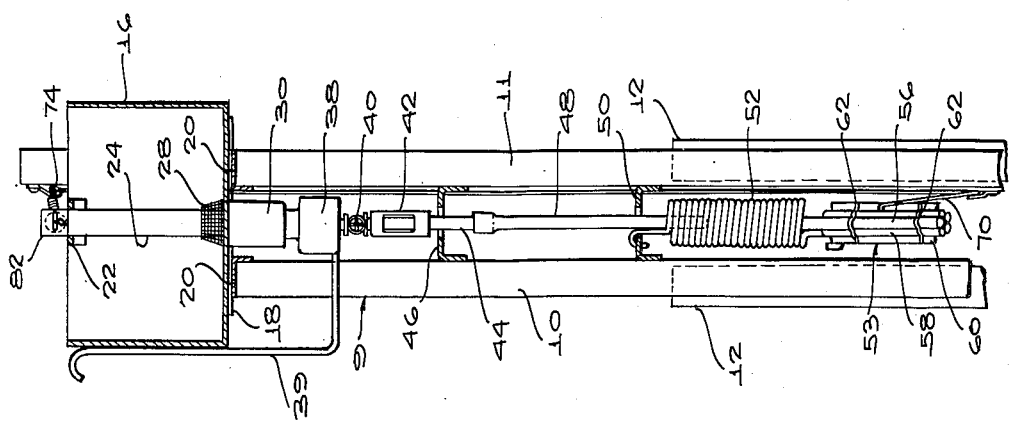

---

2,762,335

LIVESTOCK RUBBING STATION

Donald C. Assman, Winner, S. Dak.

Application May 27, 1955, Serial No. 511,708

2 Claims. (Cl. 119—157)

Summarized briefly, this invention is an upstanding, rigid frame supporting a gravity feed container for insecticides or other liquids to be applied to an animal, with flow of the container contents being normally prevented by a valve means, which is unseated responsive to flexure of a wick assembly that is disposed to receive the flowing liquid, and is resiliently, dependingly supported from the frame in a position in which the flexure will be caused by an animal rubbing thereagainst.

Among important objects of the invention are the following:

To provide a generally improved rubbing station which can be made cheaply, but will be very durable; to form a wick assembly that will be highly flexible, and yet adapted to stand heavy wear;

To arrange the wick assembly where it can be used by animals of all stages of growth;

To insure a fully controlled yet adequate flow that will be applied to a large amount of the skin area of the animals, to properly control all livestock parasites such as lice, flies, grubs, ticks, mange, etc.; and To permit visual observation and manual control of the liquid flow.

Other objects will appear from the following description, the claims appended thereto, and from the annexed drawing, in which like reference characters designate like parts throughout the several views, and wherein:

Figure 1 is a side elevational view;

Figure 2 is an enlarged, fragmentary top plan view;

Figure 3 is an enlarged vertical section on line 3—3 of Figure 1;

Figure 4 is an enlarged section on line 4—4 of Figure 2; and

Figure 5 is an enlarged, fragmentary perspective view of the wick assembly.

An upstanding, open, rigid frame generally designated 9 includes elongated, vertical, rectangularly spaced angle iron standards 10, 10, 10, 11, with the standard 11 being extended higher than the remaining standards. Tubular bracing posts 12, fixedly secured to the lower end portions of the respective standards in longitudinal contact therewith, have their lower ends embedded in concrete bases 14 sunk in the ground.

A cylindrical, open topped container 16 is supported upon parallel, spaced cross members 18 normal to and affixed to the midlength portions of horizontal, parallel support bars 20 fixedly attached at their ends to the several standards.

A horizontal cross piece 22 extends diametrically of the upper end of the container and is fixedly secured to the container, and has a center opening receiving the upper end of a vertical tube 24, having a circumferential series of small apertures 26 adjacent the bottom of container 16 defining an outlet for the container, the apertured portion of the tube being surrounded by a filter screen 28.

Integral with and depending from the container bottom is a cylindrical, cup-like projection 30 internally threaded to engage complementary threads on the lower end of tube 24. A tapered valve seat 32 formed in the lower end of said projection communicates with an outlet formed in the lower end of the projection, and a disc valve 34 normally gravitates to a seated position on the valve seat, and is connected to the lower end of a chain 36 extending within the tube 24.

A small flow accumulating receptacle 38 receives the flow from the container 16, and has a vent tube 39 (Figure 3) extending therefrom. Connected to the outlet of the receptacle 38 is a manually operable main valve 40 for shutting off the flow of the container contents, and a sight tube or glass 42 is connected between valve 40 and a short length of pipe 44 extending through a center opening formed in a horizontal brace 46 of the frame. At its lower, outlet end, pipe 44 is engaged in the upper end of a flexible hose 48, extending through a center opening formed in a second horizontal brace 50 of the frame. Members 30, 38, 40, 42, 44, and 48 cooperate to define an outlet conduit depending vertically from the container and open at its lower end.

An expansion spring 52 is connected at one end to brace 50, and the outlet end of the conduit extends into said spring. At its lower end, spring 52 is connected to the midlength portion of a wick assembly generally designated 53, and said wick assembly includes an elongated, flexible wick member having an upwardly projecting, twisted midlength part 54 disposed to receive the flow from the conduit within spring 52, and elongated, downwardly divergent end portions 56.

Referring to Figure 5, the wick member 56 is partially encased in a flexible housing composed of side by side rope members 58 which can be of sash cord material or the like, and are coextensive with the wick member. Members 56, 58 are supported upon a wide chain including rectangular, flat links 60. Upper cross pieces 62 and lower cross pieces 64 are welded to the several chain links, extending over and under the members 56, 58 to securely assemble the same with the chain while still leaving both the upper and lower surfaces of the wick accessible to an animal rubbing thereagainst. The rope members add body to the wick assembly to reinforce the same, without limiting flexure thereof, and also provide auxiliary wick members that will be saturated by the flowing liquid.

At its ends, the chain 60 is connected to expansion springs 66, attached to anchoring stakes 68.

Means to unseat the valve 34 responsive to flexure of the wick assembly by an animal includes (Figure 4) an elongated cable 70 secured to chain 60 adjacent the apex of the shallow, inverted V defined by the wick assembly. The cable is trained about a lower pulley 72 attached to standard 11, and then extends to the upper end of the standard, being there trained about an upper pulley 74. Cable 70 is connected at its upper end to one end of an expansion spring 76, connected at its other end to a connecting rod 78 loosely slidable in upstanding, spaced guides 80, 82 carried by the container. A spring 84 is circumposed about rod 78, and is abutted at one end against a collar fixed to rod 78, and at its other end against guide 80, to normally shift rod 78 to the right in Figure 4 for seating of valve 34. Rod 78, at its inner end, is connected to the upper end of chain 36. Thus, up and down, and even lateral movements of the wick assembly, caused by an animal rubbing thereagainst and aided by the spring 52, exert a pull on cable 70, shifting rod 78 to the left in Figure 4, to elevate valve 34 for effecting flow of the container contents to the wick member, to replace liquid transferred from the wick member by the rubbing action to the skin of the animal.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A livestock rubbing station comprising an upstanding, rigidly constituted, open frame; a container supported upon the upper end of the frame centrally of the frame, said container being adapted to hold liquids to be applied to an animal and having a centrally disposed outlet in its bottom, for gravity feeding of the container contents; and elongated conduit connected at one end in communication with said outlet and extending vertically, downwardly from the container, said conduit being open at its other end; valve means in said conduit, said valve means being normally closed so as to normally prevent gravitational flow of the liquid through the conduit; an expansion spring connected at one end to and depending from the frame, the open end of the conduit extending into said spring; a wick assembly in the shape of a shallow, inverted V having an elevated midlength portion formed with an upwardly projecting twisted portion extending within said spring in position to receive the flow of liquid from the open end of the conduit, said wick assembly being connected to the other end of the spring for resiliently, dependingly supporting the wick assembly from the frame medially between the ends of the wick assembly, the wick assembly being stationarily anchored at its opposite extremities and being disposed in position for rubbing of an animal thereagainst, said wick assembly being flexible over the full length thereof; and means connected between the wick assembly and valve means, arranged to unseat the valve means responsive to flexure of the wick assembly by said animal.

2. A livestock rubbing station comprising an upstanding, rigidly constituted, open frame; a container supported upon the upper end of the frame centrally of the frame, said container being adapted to hold liquids to be applied to an animal and having a centrally disposed outlet in its bottom, for gravity feeding of the container contents; and elongated conduit connected at one end in communication with said outlet and extending vertically, downwardly from the container, said conduit being open at its other end; valve means in said conduit, said valve means being normally closed so as to normally prevent gravitational flow of the liquid through the conduit; an expansion spring connected at one end to and depending from the frame, the open end of the conduit extending into said spring; a wick assembly in the shape of a shallow, inverted V having an elevated midlength portion formed with an upwardly projecting twisted portion extending within said spring in position to receive the flow of liquid from the open end of the conduit, said wick assembly being connected to the other end of the spring for resiliently, dependingly supporting the wick assembly from the frame medially between the ends of the wick assembly, the wick assembly being stationarily anchored at its opposite extremities and being disposed in position for rubbing of an animal thereagainst, said wick assembly being flexible over the full length thereof; and means connected between the wick assembly and valve means, arranged to unseat the valve means responsive to flexure of the wick assembly by said animal, said wick assembly including an elongated chain, a wick member connected to the chain in longitudinally contacting relation with the chain, the twisted portion constituting a part of said wick member, and a plurality of rope members extending in longitudinal contact with the wick member and chain and connected both to the wick member chain, to impart a selected thickness to the wick assembly.

References Cited in the file of this patent

UNITED STATES PATENTS

| | | |
|---|---|---|
| 1,800,602 | Cole | Apr. 14, 1931 |
| 2,444,212 | Weaklend | June 29, 1948 |
| 2,632,063 | Peterson | Mar. 17, 1953 |
| 2,669,969 | Rasmussen | Feb. 23, 1954 |
| 2,690,162 | Kremer | Sept. 28, 1954 |